April 29, 1930.  A. M. MONROE  1,756,128
CASING CUTTER
Filed June 25, 1927  2 Sheets-Sheet 1
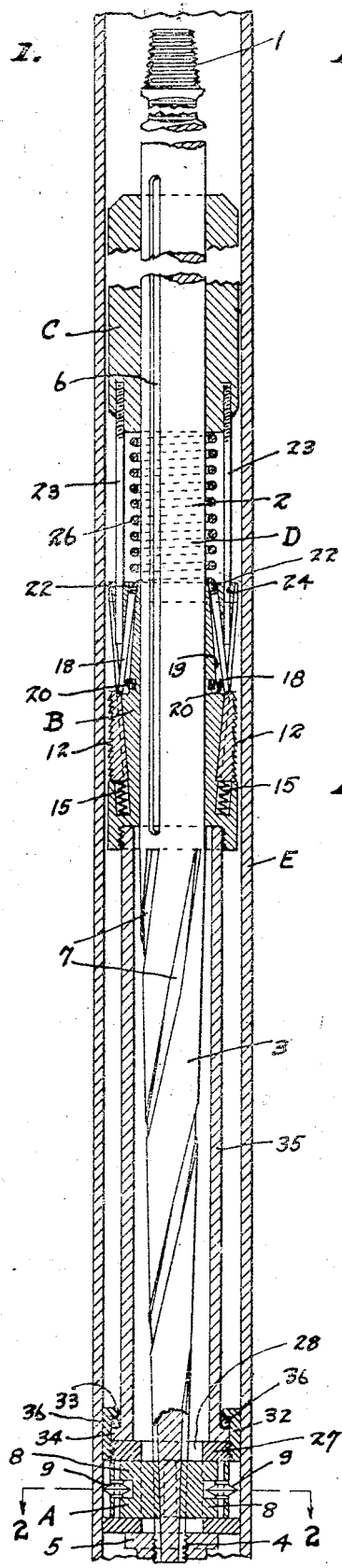
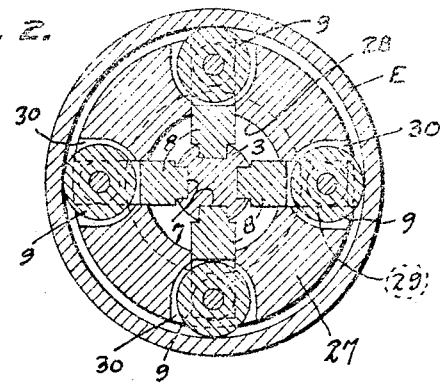
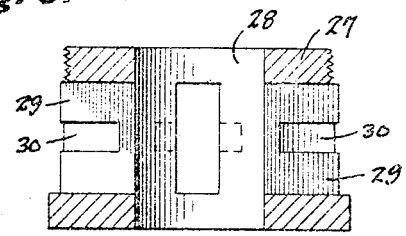
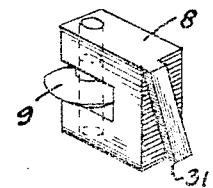
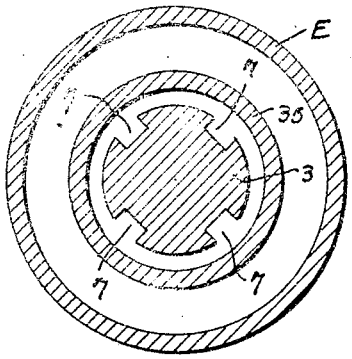
INVENTOR
ALBERT M. MONROE
BY
ATTORNEYS.

April 29, 1930.  A. M. MONROE  1,756,128
CASING CUTTER
Filed June 25, 1927  2 Sheets-Sheet 2
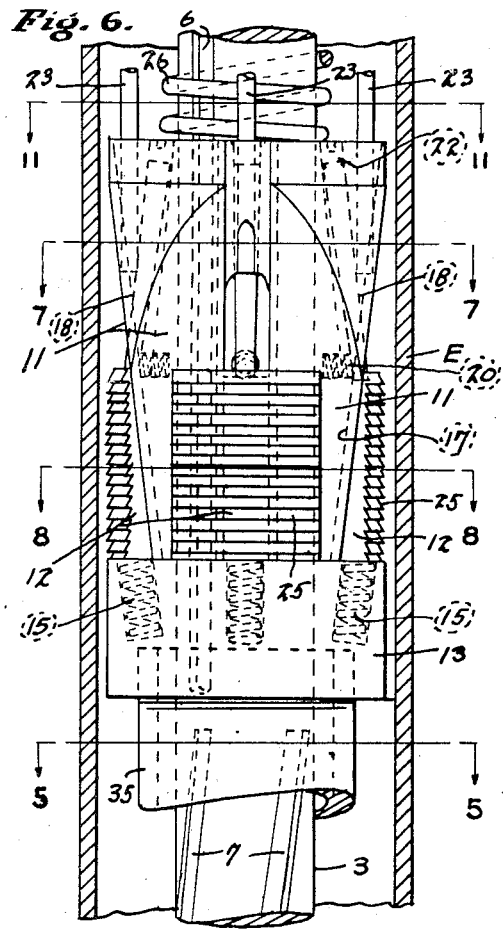
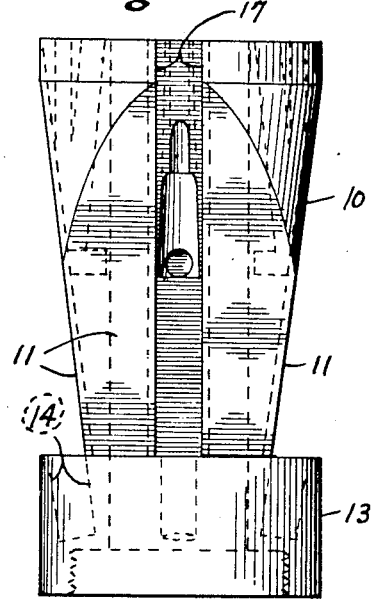
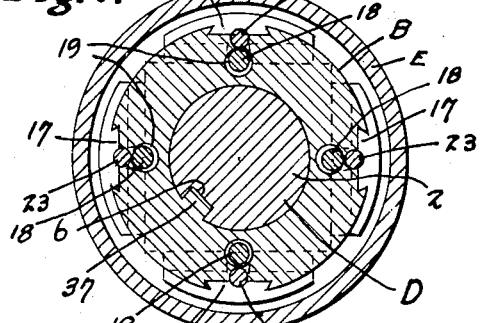
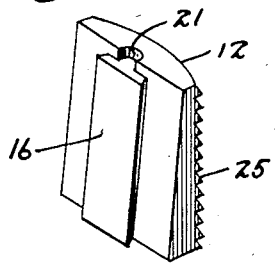
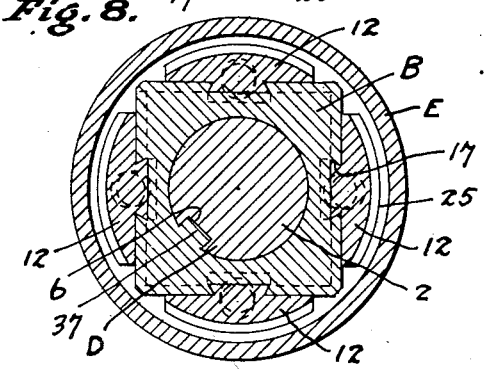
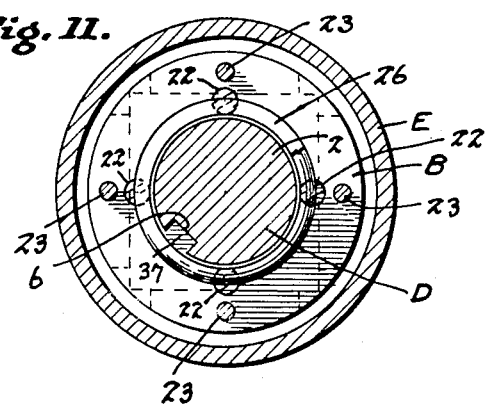
INVENTOR
ALBERT M. MONROE
BY
ATTORNEYS.

Patented Apr. 29, 1930

1,756,128

UNITED STATES PATENT OFFICE

ALBERT M. MONROE, OF TAFT, CALIFORNIA

CASING CUTTER

Application filed June 25, 1927. Serial No. 201,530.

My invention relates to improvements in casing cutters, and it consists in the combinations, constructions and arrangements hereinafter described and claimed.

An object of my invention is to provide a casing cutter which has an automatic means for gripping the interior wall of the casing at any desired depth and which makes use of novel cutting means actuated by the weight of the drill stem and jars for severing the casing.

A further object of my invention is to provide a device of the type described in which the casing gripping means is automatic in operation and will function when the device is brought to a sudden stop.

A further object of my invention is to provide a device of the type described which is simple in construction, durable and efficient for the purpose intended.

Other objects and advantages will appear in the following specification, and the novel features of my invention will be particularly pointed out in the appended claims.

My invention is illustrated in the accompanying drawings, forming a part of this application, in which Figure 1 is a vertical section through the device showing the mandrel in elevation;

Figure 2 is a section along the line 2—2 of Figure 1;

Figure 3 is a vertical section through the cutter head;

Figure 4 is a perspective view of one of the sliding blocks;

Figure 5 is a section along the line 5—5 of Figure 6;

Figure 6 is a side elevation of the anchoring head;

Figure 7 is a section along the line 7—7 of Figure 6;

Figure 8 is a section along the line 8—8 of Figure 6;

Figure 9 is a side elevation of the anchoring head with the slips removed and their associate mechanism;

Figure 10 is a persepective view of one of the slips; and

Figure 11 is a section along the line 11—11 of Figure 6.

In carrying out my invention I provide a device consisting of a cutter head A, an anchoring head B, a weight C, and a mandrel D, all of these parts being associated in a manner hereinafter described and of such a size as to be insertable into a well casing E.

I will first describe the mandrel D, because this element is the connecting link between the other parts of the device and is also securable to a set of jars, a drill stem and a cable, not shown. The mandrel D is provided with a tapered thread 1 by means of which it is attached to the operating mechanism. The mandrel has a cylindrical portion 2 of uniform diameter and a tapered portion 3, the tapered portion being provided with threads 4 at its lower end for receiving a nut 5 for a purpose hereinafter described.

The portion 2 has a straight keyway 6 extending longitudinally thereof and adapted to receive a projection 37 that extends laterally from the anchoring head B. This construction permits longitudinal movement of the mandrel D but prevents it from rotating. The tapered portion 3 is provided with four keyways 7, which are spiral and which are used for the purpose of actuating the sliding blocks 8, see Figure 2, which carry cutter discs 9, see Figure 4.

The mandrel D carries the anchoring head B for the purpose of securing the device to the casing E at any desired point along the casing. The special shape of the anchoring head is shown in Figure 9 and it will be noted from this figure that the head has a tapered portion 10, which is provided with four flat surfaces 11, these surfaces acting as guides for slips 12, see Figure 10.

The head B has a base portion 13, which acts as a stop for the slips 12 and also provides stock in which wells 14 may be drilled for receiving springs 15.

The slips 12 are guided in their movement by dovetailed projections 16, see Figure 10, which are slidably receivable in dovetailed slots 17, see Figure 8, whereby the slips are held against the anchoring head B and yet are adapted to move longitudinally along the head. The slant of the surfaces 11 causes the slips to move outwardly when they are moved away from the base 13. The springs 15 urge the slips 12 away from the base 13.

It will also be noted from Figure 1 that I provide locking means for holding the slips 12 in retracted position. This means comprises triggers 18 which are mounted in bores 19 and which are adapted to be swung about their upper ends as a pivot. The triggers 18 are tapered for this purpose. Springs 20 normally urge the triggers 18 outwardly so that the lower portions of the triggers will be received in recesses 21 in the slips 12, see Figure 10. The upper ends of the triggers 18 are held in place by set screws 22, see Figure 6. The triggers when in the position shown in Figure 1 will hold the slips 12 in inoperative position.

The means for automatically releasing the triggers 18 comprises the weight C, which is slidably mounted on the mandrel D, and which carries pins 23, see Figure 1, which are slidably received in bores 24, these bores communicating with the bores 19 so that the downward movement of the weight C with respect to the mandrel D, will cause the pins 23 to swing the triggers 18 inwardly, thus releasing the slips 12. The springs 15 will instantly cause the released slips to move upwardly and outwardly so as to engage with the interior of the casing E. The slips are provided with teeth 25 of such a shape as to prevent downward movement of the head B after the slips have once engaged with the interior of the casing.

The weight C is slidably mounted on the portion 2 and is supported above the anchoring head B by a counterbalance spring 26. The spring is interposed between the head and the weight and is of sufficient tension to normally hold the parts in the position shown in Figure 1. However, when the mandrel D is brought to a sudden stop, the weight C will continue to move and will cause the pins 23 to release the triggers 18, thus freeing the slips 12.

After the head B is secured to the casing E, the mandrel D may be lowered for actuating the cutter head A. The cutter head comprises a block 27 of the shape shown in Figures 2 and 3 and this block has a bore 28 therein for slidably receiving the tapered portion 3 and radially extending openings 29 for slidably receiving the sliding blocks 8. Recesses 30 are provided in the walls of the openings 29 for receiving the cutters 9. The inner ends of the sliding blocks 8 carry tongues 31, which are slidably receivable in the keyways 7, see Figure 2. The block 27 is screwed into a ring 32 and this ring has an inwardly extending flange 33, which overrides a flange 34 carried by a connecting sleeve 35 that secures the cutter head A to the anchoring head B. Ballbearings 36 are disposed between the flanges 33 and 34.

From the foregoing description of the various parts of the device, the operation thereof may readily be understood.

The mandrel D is connected to the operating mechanism and then the entire device is lowered into the casing E. Before lowering the device into the casing to be cut, the four slips 12 are forced down into position against the springs 15 and beneath the triggers 18, as shown in Figure 1. The device is then lowered into the casing or pipe and at the proper depth the entire apparatus is brought to a sudden stop. This causes the weight C to overcome the spring 26, thus forcing the pins 23 downwardly, releasing the triggers 18 and the slips 12. The slips 12 in turn are actuated by the springs 15 and will grip the casing E. The device is now firmly anchored in the casing.

The cutting operation may now be started by lowering the mandrel D, as the latter is lowered through the weight C and the head B. The spiral keyways 7 will cause the cutter head to rotate as the mandrel is lowered and the tapered portion 3 will move the cutters outwardly causing them to sever the pipe or casing. In this way the casing is severed at the desired point.

The purpose of the nut 5 is to normally support the parts which surround the mandrel D. It will also be noted that after the pipe has been cut, the withdrawal of the apparatus will cause the nut 5 to strike the bottom of the cutter head and to jar the slips 12 loose for permitting the tool to be raised to the surface.

Although I have shown and described one embodiment of my invention, it is to be understood that the same is susceptible of various changes and I reserve the right to employ such changes as may come within the scope of the appended claims.

I claim:

1. In a device of the type described, an anchoring head, casing engaging members slidably carried by said head, spring means for urging said members into operative position, locking means for holding said members in inoperative position and a weight for releasing said locking means.

2. A device of the type described, comprising a mandrel, an anchoring head carried by said mandrel, means carried by said head for securing said head to a well casing, a weight slidably carried by said mandrel, means for locking said head securing means in inoperative position, means operable by said weight for releasing said locking means, a cutter head carried by said anchoring head, cutter carrying blocks slidably disposed in said cutter head, said mandrel having a tapered spirally grooved portion for engaging with said blocks when said mandrel is moved with respect to said cutter head.

3. In a casing cutter, an anchoring head, slips carried by said head, spring means for moving said slips into operative position, triggers holding said slips in inoperative position, and a weight for releasing said triggers when said anchoring head is brought to an abrupt stop.

4. In a casing cutter, a mandrel having a tapered spirally-threaded portion, an anchoring head carried by said mandrel, a cutter head carried by said anchoring head, slips carried by said anchoring head for automatically engaging with a well casing when released, a weight for releasing said slips, cutters carried by said cutter head and being operatively connected to the spirally threaded portion of said mandrel, whereby a movement of this portion will rotate said cutters and cause them to move outwardly.

5. A casing cutter comprising a mandrel, a cutter head, an anchoring head, means for securing said anchoring head to the casing, yielding means for urging said securing means into operative position with the casing, a weight whose inertia permits said yielding means to become active when said mandrel is brought to an abrupt stop and means for actuating said cutter head.

6. A casing cutter comprising a mandrel, a cutter head, an anchoring head, a mandrel connecting said heads together, yielding means for urging said anchoring head to engage with the casing, a movable weight, whose inertia permits said yielding means to become active when said mandrel is brought to an abrupt stop, said mandrel being movable for actuating said cutter head.

ALBERT M. MONROE.